Sept. 26, 1961  W. J. WILLIAMS, JR  3,002,153
HORIZONTAL SWEEP GENERATOR
Filed July 8, 1958
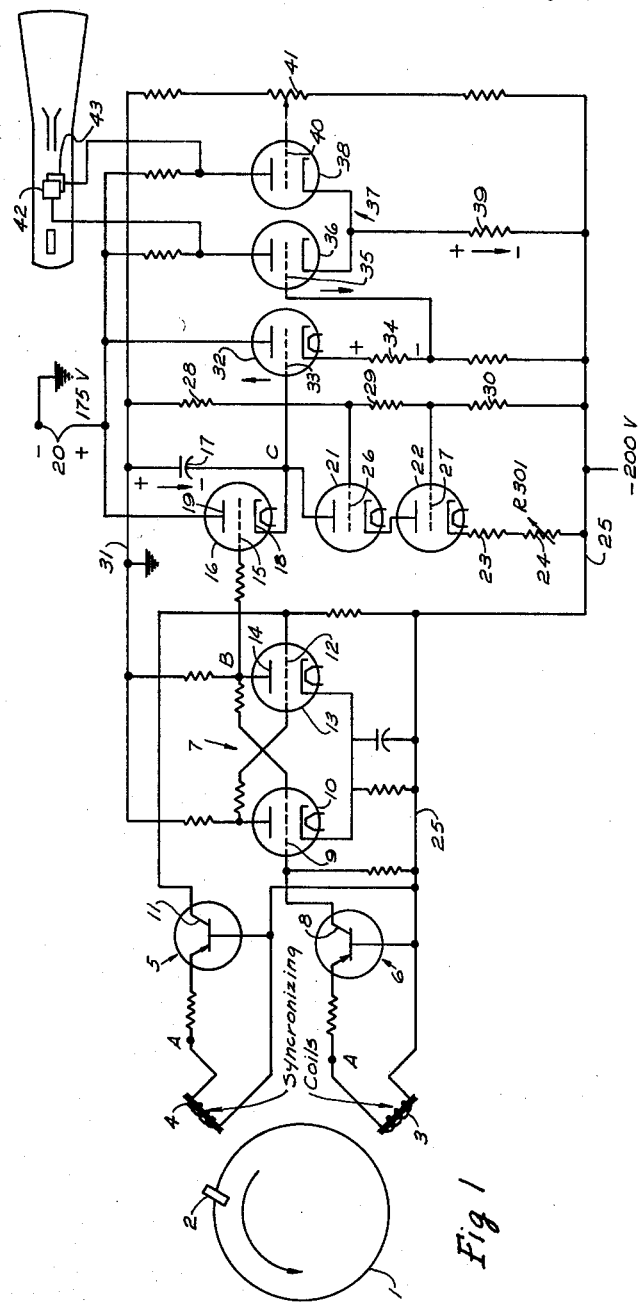
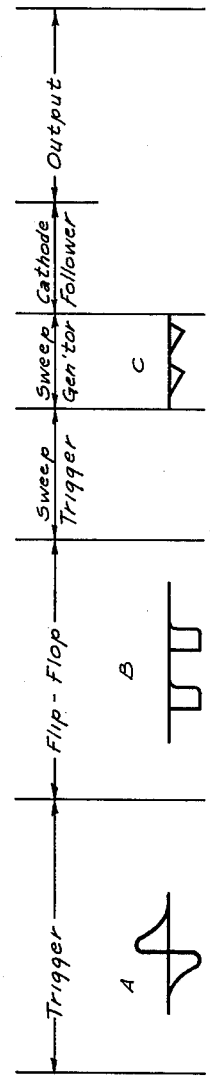
INVENTOR.
Walter J. Williams, Jr.
BY
Attorneys United States Patent Office 3,002,153
Patented Sept. 26, 1961

3,002,153
HORIZONTAL SWEEP GENERATOR
Walter J. Williams, Jr., Fort Wayne, Ind., assignor to International Telephone and Telegraph Corporation
Filed July 8, 1958, Ser. No. 747,283
11 Claims. (Cl. 328—63)

The present invention relates to a horizontal sweep generator, and more particularly to a sweep signal generator which is mechanically actuated and which produces a sweep wave having a high degree of linearity.

In mechanical scanning apparatus wherein an oscilloscope is used to display the information received by the apparatus, it is necessary that the scanning or sweeping of the cathode ray beam in the oscilloscope be accurately synchronized with the movement of the apparatus scanning element. In one application, this scanning element rotates, thereby requiring that the sweeping of the cathode ray beam be synchronized with this rotation. This is accomplished by providing an actuating device on the rotating element which energizes two stationary, angularly spaced-apart sensing devices, each sensing device generating a signal used in controlling the initiation and termination of the cathode ray sweep for each rotation of the scanning element. In accomplishing this control of the sweep, the two signals of the sensing devices are utilized respectively to initiate the charging of a sweep capacitor and a finite time later, depending upon the speed of rotation of the scanning element, discharging this capacitor almost instantaneously. The voltage wave generated over this capacitor is applied to the beam-deflecting elements of an ordinary cathode ray tube, whereupon the beam will be deflected in a given direction in synchronism with the rotation of the scanning element.

It is an object of this invention to provide a sweep generator for an oscilloscope, which derives its sweep frequency from a mechanically rotating actuator.

It is another object of this invention to provide a sweep generator for generating a sweep wave which is precisely initiated and terminated by a rotating actuator.

It is still another object of this invention to provide a sweep generator which provides a constant current source for charging a sweep capacitor, the sweep generator being controlled in its operation by a mechanically rotating actuator.

It is yet another object of this invention to provide a sweep generator actuated by a rotatable actuator and generating a sweep wave having a linearity better than one percent (1%).

In accomplishing the foregoing objects, there is provided a sweep generator for a cathode ray oscilloscope which comprises a magnet rotatable past a pair of stationary, angularly spaced-apart pickup coils, the magnet inducing signals in the coils as it passes by, a pair of normally nonconductive triggering circuits coupled to the pickup coils respectively, the triggering circuits being rendered conductive by said signals respectively, a bistable multivibrator coupled to said pair of triggering circuits and being actuated sequentially by the two signals thereof, a charging capacitor and a constant current source connected in series, a switching device shunt-connected across the charging capacitor, and a connection between the switching device and the output circuit of the multivibrator whereby the switching circuit is selectively rendered conductive and nonconductive in response to the two different output signals derived from the multivibrator in response to the two signals of the sensing devices, respectively.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic diagram of one embodiment of this invention; and

FIG. 2 is an illustration of waveforms used in explaining the operation of the circuit of FIG. 1.

Referring to the drawings, a scanning element 1 comprises a non-metallic ring or disc rotatable about its axis and carrying a bar magnet or actuator 2 on the periphery thereof. Located adjacent the rotational path of the magnet 2 are two stationary, angularly spaced-apart sensing elements or pickup coils 3 and 4 having leads, respectively, which are coupled to two transistor-triggering circuits 5 and 6, respectively. The transistors of these two circuits 5 and 6 are normally biased to be nonconductive from the collector to the emitter so long as the base to emitter voltage is zero or negative. They are rendered conductive only when a positive voltage pulses is received from the respective pickup coil 3, 4.

Coupled to the two triggering circuits 5 and 6 is a bistable or flip-flop multivibrator, as generally indicated by the reference numeral 7. The collector 8 of the transistor circuit 6 is connected to the grid 9 of one of the multivibrator tubes, and the collector 11 of the transistor circuit 5 is connected to the grid 12 of the other multivibrator tube 13. This multivibrator 7 is of conventional construction and operates in the usual manner to produce two different stable output signals in response to two input signals sequentially applied to the two control grids 9 and 12.

To the anode 14 of the tube 13 is connected the control grid 15 of a switching triode 16, the conductivity of this triode being controlled by the output signals of the multivibrator 7. A charging or sweep capacitor 17 is shunt-connected across the tube 16, this connection being made to the cathode 18 and anode 19 via a low impedance power supply which is coupled to the supply terminals 20. When the tube 16 is conducting, the capacitor 17 is shortcircuited, but when the tube 16 is not conducting, the capacitor 17 is bridged by a high impedance or virtual open circuit which permits the capacitor to charge linearly.

Two triodes 21 and 22 are connected in cascode and in series with the sweep capacitor 17, two series-connected resistors 23 and 24 being connected between the cathode of the tube 22 and a negative voltage supply line 25. Bias for the control grids 26 and 27 of the two triodes 21 and 22 is obtained from a voltage-dividing network composed of three series-connected resistors 28, 29 and 30. These resistors are connected across a source of supply voltage which is applied between the line 25 and positive ground line 31. The bias supply to the two control grids 26 and 27 is of a value which renders the two tubes 21 and 22 equal in current-conducting characteristics, the reason for this condition of operation becoming apparent from the following explanation.

A cathode follower 32 has its control grid 33 direct-coupled to the lower terminal of the sweep capacitor 17, the cathode being connected to the supply line 25 by means of a suitable resistor 34. The output signal from the cathode follower is direct-coupled from the lower end of the resistor 34 to the control grid 35 of one tube 36 of a differential amplifier which is indicated generally by the numeral 37. The cathodes of the two differential amplifier tubes 36 and 38 are connected together and to the supply line 25 through a suitable biasing resistor 39. Bias for the control grid 40 of the tube 38 is derived from a variable resistor 41 which is connected between the supply lines 31 and 25. The horizontal deflection plates 42 and 43 of a conventional cathode ray tube are shown as connected respectively to the anodes of the two tubes 36 and 38.

In explaining the operation of the invention, it will first be assumed that the tube 10 of the multivibrator 7 is conducting and the tube 13 is cut off. For one complete revolution of the scanning element 1 in a direction of the arrow, the magnet 2 will first pass the pickup coil 3. A voltage pulse is thereupon induced in the pickup coil, as indicated in FIG. 2 by the letter "A," which is coupled to the transistor circuit 6. The transistor circuit 6 was previously nonconducting, but upon application of the positive lobe of the signal "A," the circuit becomes conductive and virtually short-circuits the control grid 9 of the tube 10 to the supply line 25. The tube 10 thereupon cuts off, raising the voltage on the control grid 12 of the tube 13. This renders the tube 13 conductive, dropping the voltage on the anode 14, which voltage as applied to the grid 15 of the switch 16 renders the latter nonconductive. The sweep capacitor 17 now starts to charge through the cascode circuit 21, 22, 23, 24, this cascode circuit serving as a constant current source for charging the capacitor 17. The signal developed over the capacitor 17 is coupled to the cathode follower 32 and from the cathode follower to the differential amplifier 37. Since the control grid 35 of the differential amplifier is effectively coupled to the lower terminal of the sweep capacitor 17 and the control grid 40 is coupled to the upper terminal of the capacitor, the two tubes 36 and 38 will be driven in opposite directions of conductivity, thereby producing positive and negative voltages on the two deflection plates 42 and 43, respectively.

After passing the pickup coil 3 and initiating the charging of the sweep capacitor 17, continued rotation of the magnet 2 results in the magnet moving past the pickup coil 4 which, like pickup coil 3, generates a signal rendering the transistor circuit 5 conductive. This shorts the control grid 12 of the multivibrator tube 13 to the negative supply line 25, thereupon cutting off the tube 13 and rendering the tube 10 conductive. The voltage on the anode 14 immediately rises, as shown in waveform "B" of FIG. 2, rendering the switching tube 16 conductive. This results in a short-circuit across the capacitor 17, which almost instantaneously discharges the same. The pattern of the charging voltage thereupon becomes a linear sawtooth as indicated by the waveform "C" in FIG. 2, which waveform is coupled through the cathode follower 32 to the differential amplifier 37.

From the foregoing, it will be apparent that for each revolution of the magnet 2, one complete sawtooth sweep wave will be produced, the magnet passing the pickup coil 3 initiating the sweep wave, and the passing of the pickup coil 4 terminating the wave.

The sawtooth wave "C" of FIG. 2 has a linearity better than one percent (1%), and this is attributed primarily to the cascode circuit 21, 22, 23, 24, which provides a constant charging current for the capacitor 17. The two control grids 26 and 27 are biased so as to equalize the conductivity of the two triodes 21 and 22, and the values of the resistances 23 and 24 are so selected to assure linearity in the charging current. This linearity is preserved in the following circuitry by means of the direct-coupling between the capacitor 17, the cathode follower and the differential amplifier, this linearity being most pronounced at one particular speed of rotation of the scanning element 1.

Horizontal positioning of the beam in the cathode ray tube is obtained by adjusting the variable resistor 41, which determines the D.C. level of the control grid 40. The amplitude of the sweep signal "C" is adjusted by means of the resistor 24, which determines the magnitude of the constant current through the cascode circuit.

While I have described above the principles of my invention in connection with specific apparatus, it is to be clearly understood that this description is made only by way of example and not as a limitation to the scope of my invention.

What is claimed is:

1. A sweep generator for a cathode ray oscilloscope comprising a body movable between two positions, two spaced-apart sensing devices for producing two signals representative of said two positions of said body, respectively, a sweep-generating circuit for producing a sawtooth sweep wave, and means responsive to the two signals of said sensing devices for respectively initiating and terminating the generation of said sweep wave by said circuit.

2. A sweep generator for a cathode ray oscilloscope comprising a rotatable element, two angularly spaced-apart sensing devices disposed adjacent the path of rotation of said element and generating two signals corresponding to two different angular positions respectively of said element, a sweep-generating circuit for producing a saw-tooth sweep wave, and means responsive to the two signals of said sensing devices for respectively initiating and terminating the generation of said sweep wave by said circuit.

3. A sweep generator for a cathode ray oscilloscope comprising a sweep-generating circuit including a charging capacitor having a source of charging potential in series therewith for producing a saw-tooth sweep wave, switching means shunt-connected across said capacitor, a rotatable element, two angularly spaced-apart sensing devices disposed adjacent the path of rotation of said element and generating two signals corresponding to two different angular positions, respectively, of said element, and triggering means responsive to said two signals for changing said switching means between conductive and non conductive states thereby respectively to initiate and terminate generation of said sweep wave by said sweep generator circuit.

4. A sweep generator for a cathode ray oscilloscope comprising a sweep-generating circuit including a charging capacitor having a source of charging potential in series therewith for producing a saw-tooth sweep wave, switching means shunt-connected across said capacitor, a rotatable element, two angularly spaced-apart sensing devices disposed adjacent the path of rotation of said element and generating two signals corresponding to two different angular positions, respectively, of said element, a bi-stable multivibrator coupled to said switching means for controlling the state of conduction thereof, and a pair of triggering circuits coupled to said mulitivbrator and to said two sensing devices, respectively, said triggering circuits being normally non-conductive and rendered conductive only when signals from said sensing devices are applied thereto, said multivibrator generating output signals representative of the signals produced by said sensing devices, and means coupling the output signals of said multivibrator to said switching means, said switching means being responsive to said two multivibrator output signals to change between conductive and nonconductive states of operation thereby respectively to initiate and terminate generation of said sweep wave by said sweep generator circuit.

5. A sweep generator for a cathode ray oscilloscope comprising a magnet movable along a given circular path, a pair of angularly spaced-apart pickup coils positioned adjacent said path, said magnet inducing a signal in each of said coils as it moves there-past, a pair of normally nonconductive triggering circuits coupled to said pickup coils respectively, said triggering circuits being rendered conductive by said signals respectively, a bi-stable multivibrator having input and output circuits and producing two stable output signals, said triggering circuits being coupled to said input circuit for controlling the operation of said multivibrator, a sweep-generating circuit including a charging capacitor and a resistance circuit connected in series for producing a saw-tooth sweep wave, a switching circuit shunt-connected across said capacitor, said switching circuit being coupled to said multivibrator output circuit and operable by the signals thereof between conductive and nonconductive conditions thereby respectively to initiate and terminate generation of said sweep wave by said sweep generator circuit, and output circuit means coupled across said capacitor.

6. A sweep generator for a cathode ray oscilloscope comprising a magnet movable along a given circular path, a pair of angularly spaced-apart pickup coils positioned adjacent said path, said magnet inducing a signal in each of said coils as it moves there-past, a pair of normally nonconductive triggering circuits coupled to said pickup coils respectively, said triggering circuits being rendered conductive by said signals respectively, a bi-stable multivibrator having input and output circuits and producing two stable output signals, said triggering circuits being coupled to said input circuit for controlling the operation of said multivibrator, a sweep-generating circuit including a charging capacitor and a constant current source connected in series therewith for producing a saw-tooth sweep wave, an electron discharge device having anode, cathode and control grid elements, said capacitor being shunt-connected across said anode and cathode elements, said control grid being coupled to the output circuit of said multivibrator, one of said multivibrator output signals rendering said electron discharge device conductive and the other output signal rendering it nonconductive thereby respectively to initiate and terminate generation of said sweep wave by said sweep generator circuit, and output circuit means coupled across said capacitor.

7. A sweep generator for a cathode ray oscilloscope comprising a magnet movable along a given circular path, a pair of angularly spaced-apart pickup coils positioned adjacent said path, said magnet inducing signals in said coils as it moves there-past, a pair of normally nonconductive triggering circuits coupled to said pickup coils respectively, said triggering circuits being rendered conductive by said signals respectively, a bi-stable multivibrator having input and output circuits and producing two stable output signals, said triggering circuits being coupled to said input circuit for controlling the operation of said multivibrator, a charging capacitor, two triodes connected in a cascode circuit arrangement, said charging capacitor and the anode of said cascode circuit being connected in series, a resistor connected in series with the cathode of said cascode circuit, said resistor having a resistance which linearizes the current-conducting characteristics of said cascode circuit, a source of unidirectional potential connected across the series capacitor, resistor, and cascode circuit, a voltage-dividing network connected across said source and having different voltage connections with the control grids of said two triodes, said voltage connections providing bias for said control grids of a value which equalizes the current conducting characteristics of said two triodes, a switching tube connected in shunt across said charging capacitor, said switching tube having a control grid coupled to the output circuit of said multivibrator, one of said multivibrator output signals rendering said switching tube conductive and the other output signal rendering it nonconductive, and output circuit means coupled across said capacitor.

8. A sweep generator for a cathode ray oscilloscope comprising a magnet movable along a given circular path, a pair of angularly spaced-apart pickup coils positioned adjacent said path, said magnet inducing signals in said coils as it moves there-past, a pair of normally nonconductive triggering circuits coupled to said pickup coils respectively, said triggering circuits being rendered conductive by said signals respectively, a bi-stable multivibrator having input and output circuits and operative between two stable output signals, said triggering circuits being coupled to said input circuit for controlling the operation of said multivibrator, a charging capacitor, two triodes connected in a cascode circuit arrangement, said charging capacitor and the anode of said cascode circuit being connected in series, a resistor connected in series with the cathode of said cascode circuit, said resistor having a resistance which linearizes the current-conducting characteristics of said cascode circuit, means equalizing the current-conducting characteristics of said two triodes, a switching tube connected in shunt across said charging capacitor, said switching tube having a control grid coupled to the output circuit of said multivibrator, one of said multivibrator output signals rendering said switching tube conductive and the other output signal rendering it nonconductive, and output circuit means coupled across said capacitor.

9. A sweep generator for a cathode ray oscilloscope comprising a magnet movable along a given circular path, a pair of angularly spaced-apart pickup coils positioned adjacent said path, said magnet inducing signals in said coils as it moves there-past, a pair of normally nonconductive triggering circuits coupled to said pickup coils respectively, said triggering circuits being rendered conductive by said signals respectively, a bi-stable multivibrator having input and output circuits and producing two stable output signals, said triggering circuits being coupled to said input circuit for controlling the operation of said multivibrator, a charging capacitor, two triodes connected in a cascode circuit arrangement, said charging capacitor and the anode of said cascode circuit being connected in series, a resistor connected in series with the cathode of said cascode circuit, said resistor having a resistance which linearizes the current-conducting characteristics of said cascode circuit, a source of unidirectional potential connected across the series capacitor resistor and cascode circuit, a voltage-dividing network connected across said source and having different voltage connections with the control grids of said two triodes, said voltage connection providing bias for said control grids of a value which equalizes the current conducting characteristics of said two triodes, a switching tube connected in shunt across said charging capacitor, said switching tube having a control grid coupled to the output circuit of said multivibrator, one of said multivibrator output signals rendering said switching tube conductive and the other output signal rendering it nonconductive, a cathode follower having input and output circuits, said charging capacitor being direct-coupled to said cathode follower input circuit, and a differential amplifier having input and output circuits, the cathode follower output circuit being direct-coupled to the input circuit of said differential amplifier.

10. The sweep generator of claim 9 wherein the cascode circuit resistor is variable.

11. A sweep generator for a cathode ray oscilloscope comprising a magnet movable along a given path, a pair of spaced-apart pickup coils positioned adjacent said path, said magnet inducing signals in said coils as it moves there-past, a pair of normally nonconductive triggering circuits coupled to said pickup coils respectively, said triggering circuits being rendered conductive by said signals respectively, a bi-stable multivibrator having input and output circuits and producing two stable output signals, said triggering circuits being coupled to said input circuit for controlling the operation of said multivibrator, a charging capacitor, two triodes connected in a cascode circuit arrangement, said charging capacitor and the anode of said cascode circuit being connected in series, a resistor connected in series with the cathode of said cascode circuit, said resistor having a resistance which linearizes the current-conducting characteristics of said cascode circuit, a source of unidirectional potential connected across the series capacitor, resistor, and cascode circuit, a voltage-dividing network connected across said source and having different voltage connections with the control grids of said two triodes, said voltage connections providing bias for said control grids of a value which equalizes the current conducting characteristics of said two triodes, a switching tube connected in shunt across said charging capacitor, said switching tube having a control grid coupled to the output circuit of said multivibrator, one of said multivibrator output signals rendering said switching tube conductive and the other output signal rendering it nonconductive, and output circuit means coupled across said capacitor.

References Cited in the file of this patent

UNITED STATES PATENTS

| | | |
|---|---|---|
| 2,431,766 | Miller et al. | Dec. 2, 1947 |
| 2,630,529 | Mann et al. | Mar. 3, 1953 |
| 2,661,421 | Talamini et al. | Dec. 1, 1953 |
| 2,685,026 | Cathcart | July 27, 1954 |